(12) United States Patent
Gombert et al.

(10) Patent No.: US 8,174,720 B2
(45) Date of Patent: May 8, 2012

(54) PACKAGING DIGITAL FRONT END

(75) Inventors: Barry Glynn Gombert, Rochester, NY (US); Philip Crane Rose, Sodus, NY (US); John Oliver Walker, Rochester, NY (US); Jennifer Colleen Perotti, Pittsford, NY (US); Robert Roy Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 820 days.

(21) Appl. No.: 12/266,248

(22) Filed: Nov. 6, 2008

(65) Prior Publication Data

US 2010/0110479 A1    May 6, 2010

(51) Int. Cl.
*G06F 3/12*    (2006.01)

(52) U.S. Cl. ...... 358/1.15; 358/1.18; 358/402; 358/403; 345/419; 700/163; 700/233; 707/84; 53/456

(58) Field of Classification Search ................ 358/1.15, 358/1.18, 402, 442, 403; 364/478.07, 478.1, 364/191, 140; 345/419; 700/263, 23, 98, 700/118, 233; 707/84; 53/456
See application file for complete search history.

(56) References Cited

U.S. PATENT DOCUMENTS

| | | | | |
|---|---|---|---|---|
| 3,902,655 A | * | 9/1975 | Huffman | 229/69 |
| 5,457,904 A | * | 10/1995 | Colvin | 40/119 |
| 5,513,117 A | * | 4/1996 | Small | 700/233 |
| 5,518,574 A | * | 5/1996 | Yates et al. | 156/356 |
| 5,768,142 A | * | 6/1998 | Jacobs | 700/231 |
| 5,838,574 A | * | 11/1998 | Olson et al. | 700/219 |
| 5,881,538 A | * | 3/1999 | Blohm | 53/461 |
| 5,923,556 A | * | 7/1999 | Harris | 700/117 |
| 5,974,234 A | * | 10/1999 | Levine et al. | 358/1.16 |
| 6,020,973 A | * | 2/2000 | Levine et al. | 358/1.15 |
| 6,090,027 A | * | 7/2000 | Brinkman | 493/54 |
| 6,092,054 A | * | 7/2000 | Tackbary et al. | 705/26.1 |
| 6,117,061 A | | 9/2000 | Popat et al. | |
| 6,246,468 B1 | | 6/2001 | Dimsdale | |
| 6,689,035 B1 | | 2/2004 | Gerber | |
| 7,013,616 B1 | | 3/2006 | Powers et al. | |

(Continued)

FOREIGN PATENT DOCUMENTS

WO    WO 2005122079 A2    12/2005

(Continued)

OTHER PUBLICATIONS http/www.esko.com/tmp/080606115325/G2558322_Kongsberg_tables_us_pdf, Mar. 17, 2008.

(Continued)

*Primary Examiner* — Negussie Worku
(74) *Attorney, Agent, or Firm* — Fox Rothschild LLP

(57) ABSTRACT

A package assembly method and system may include a processor, a more printing device, an assembly device, a knowledge base containing a structural design ontology, and a memory structure. A memory structure may contain instructions that instruct the processor to query the knowledge base to obtain a two dimensional package model based on a known three dimensional package model and a set of intents, convert a three dimensional graphic representation to a two dimensional graphic representation using a semantic structure, access a packaging rule set to obtain rules for assembly of a three dimensional package from the model, instruct a printing device to apply the two dimensional graphic representation to the two dimensional package model, and instruct the assembly device to apply the rules for assembly to create the three dimensional package.

18 Claims, 4 Drawing Sheets

U.S. PATENT DOCUMENTS

| | | | |
|---|---|---|---|
| 7,099,038 B2* | 8/2006 | Schuller | 358/1.18 |
| 7,293,652 B2 | 11/2007 | Learn et al. | |
| 7,293,655 B2* | 11/2007 | Messinger | 206/586 |
| 7,765,469 B2* | 7/2010 | Sembower et al. | 715/243 |
| 7,895,049 B2* | 2/2011 | O'Sullivan et al. | 705/1.1 |
| 2002/0085001 A1 | 7/2002 | Taylor | |
| 2002/0118874 A1 | 8/2002 | Chung et al. | |
| 2003/0035138 A1 | 2/2003 | Schilling | |
| 2003/0083763 A1 | 5/2003 | Kiyohara et al. | |
| 2003/0091227 A1 | 5/2003 | Chang et al. | |
| 2003/0164875 A1 | 9/2003 | Myers | |
| 2003/0200111 A1 | 10/2003 | Damji | |
| 2004/0073407 A1 | 4/2004 | Nguyen et al. | |
| 2004/0120603 A1 | 6/2004 | Gupta | |
| 2005/0005261 A1 | 1/2005 | Severin | |
| 2005/0050052 A1 | 3/2005 | Zimmerman et al. | |
| 2005/0249400 A1 | 11/2005 | Fukumoto | |
| 2006/0080274 A1 | 4/2006 | Mourad | |
| 2006/0155561 A1 | 7/2006 | Harper | |
| 2006/0217831 A1 | 9/2006 | Butterworth et al. | |
| 2006/0284360 A1 | 12/2006 | Hume et al. | |
| 2007/0041035 A1 | 2/2007 | Sembower et al. | |
| 2007/0042885 A1 | 2/2007 | Rietjens et al. | |
| 2007/0053001 A1* | 3/2007 | Huntley et al. | 358/1.18 |
| 2007/0112460 A1 | 5/2007 | Kiselik | |
| 2007/0172986 A1 | 7/2007 | Huang et al. | |
| 2008/0048308 A1 | 2/2008 | Lam | |
| 2008/0255945 A1 | 10/2008 | Percival et al. | |
| 2009/0063381 A1 | 3/2009 | Chan et al. | |
| 2009/0070213 A1 | 3/2009 | Miller et al. | |
| 2009/0236752 A1 | 9/2009 | Lee et al. | |
| 2009/0268250 A1* | 10/2009 | Tolomei et al. | 358/1.18 |
| 2009/0282782 A1 | 11/2009 | Walker et al. | |
| 2009/0287632 A1 | 11/2009 | Gombert et al. | |
| 2009/0287717 A1 | 11/2009 | Gombert et al. | |
| 2010/0060909 A1 | 3/2010 | Conescu et al. | |
| 2011/0116133 A1* | 5/2011 | Walker et al. | 358/1.18 |

FOREIGN PATENT DOCUMENTS

WO    WO 2007021920 A2    2/2007

OTHER PUBLICATIONS

Liang Lu et al, "Folding Cartons with Fixtures: A Motion Planning Approach", IEEE Transactions on Robotics and Automation, vol. 16, No. 4, Aug. 2000.

http/www.esko.com/tmp/080606115325/G2558322_Kongsberg_tables_us_pdf, Date of publication NPL Mar. 17, 2008.

* cited by examiner

PACKAGING DIGITAL FRONT END

BACKGROUND

The disclosed embodiments relate generally to methods and systems for package assembly.

Package assembly typically requires multiple participants and resources. Initially, a brand manager teams with a structural designer to obtain an appropriate structural design definition that meets specified requirements. The structural design definition must be compatible with the production process. The structural design definition is then forwarded to a graphic artist who creates graphics used in the printing process. In some cases, the graphical and structural designs are passed between the brand manager and the graphic artist several times before such structural and graphic designs are finalized. At that point, the graphic design is used to create a set of plates for the printing process and the structural design drive is used in the creation of a compatible set of dies. The packaging flats are then printed, die-cut and converted to a form (e.g., ready to erect) that is compatible with the fulfillment process.

This process introduces the potential for errors due to the iterative nature of creating the structural and graphic designs. Also, the process has long lead times and a slow turn around which results in an extended product development cycle. As a result, the flexibility of creating new packages and graphics is limited. As such, it is time consuming and expensive to create sample packages and prototypes using conventional process.

SUMMARY

In an embodiment, a package assembly system includes a processor, one or more printing devices operatively coupled to the processor, one or more assembly devices operatively coupled to the processor, a knowledge base containing a structural design ontology; and a memory structure. The memory structure contains instructions that instruct the processor to query the knowledge base to obtain a two dimensional package model based on a known three dimensional package model and a set of intents, convert a three dimensional graphic representation to a two dimensional graphic representation using a semantic structure, access a packaging rule set to obtain one or more rules for assembly of a three dimensional package from the two dimensional package model, instruct the one or more printing devices to apply the two dimensional graphic representation of the three dimensional graphic to the two dimensional package model, and instruct the one or more assembly devices to apply the rules for assembly to create the three dimensional package from the two dimensional package model.

Optionally, the memory structure may contain instructions that instruct the processor to monitor operation of the one or more assembly devices and the one or more printing devices to determine whether modification of the application of the rules is required, and modify the application of the rules. Optionally, the knowledge base may be distributed across two or more of the printing devices or assembly devices. In some embodiments, the assembly devices include a die cutter.

In an alternate embodiment, a method of assembling a package, includes querying a knowledge base to obtain a two dimensional package model based on a known three dimensional package model and a set of intents; converting a three dimensional graphic representation to a two dimensional graphic representation using a semantic structure; accessing a packaging rule set to obtain one or more rules for assembly of a three dimensional package from the two dimensional package model; instructing one or more printing devices to apply the two dimensional graphic representation of the three dimensional graphic to the two dimensional package model; and instructing one or more assembly devices to apply the one or more rules for assembly to create the three dimensional package from the two dimensional package model.

Optionally, the method also includes monitoring operation of the one or more assembly devices and the one or more printing devices to determine whether modification of the application of the one or more rules is required; and modifying the application of the rules.

Optionally, the two dimensional package model includes a plurality of shapes and facets to be assembled into a package, and the step of querying the knowledge base may include applying the set of intents to the knowledge base.

Before the querying, the method may include receiving a user input; and determining a set of intents based on the user input, wherein the set of intents comprises an anticipated use of the three dimensional package. Determining the set of intents may include applying a semantic reasoner to the user input to translate the input into the set of intents.

Optionally, the method also may include instructing a die cutter to cut a material into the three dimensional package corresponding to the facets and shapes.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Thus, for example, reference to a "package" is a reference to one or more packages and equivalents thereof known to those skilled in the art, and so forth. Sinless defined otherwise, all technical and scientific terms used herein have the same meanings as commonly understood by one of ordinary skill in the art. As used herein, the term "comprising" means "including, but not limited to."

A "computing device" processes data to perform one or more functions. A computing device may interpret and execute instructions. A computing device may be any processor-based device such as, for example, a server, a personal computer, a personal digital assistant, a web-enabled phone, a smart terminal, a dumb terminal and/or other electronic device capable of communicating in a networked environment.

A "printing device" is an electronic device that is capable of receiving commands, printing text and/or images on a substrate, and/or scanning a document. Printing devices may include, but are not limited to, network printers, production printers, copiers and other devices using ink or toner, and scanners. Printing devices may also perform a combination of functions such as printing/scanning, in which case such devices may be considered to be multifunctional devices.

An "assembly device" is a device used in an assembly line that performs an operation. For example, an assembly device may be used in a package construction process. An assembly device may include a die cutter. An assembly device may perform operations such as, but not limited to, printing, scanning, folding, sealing, creasing and/or perforating.

A "knowledge base" is an electronic repository of searchable data. A knowledge base may refer to a software component, such as, but not limited to, a database or a table. Alternatively, a knowledge base may refer to a hardware component, such as, but not limited to, a tangible storage medium. As discussed below, a knowledge base includes data in the form of an ontology.

A "semantic reasoner" is a processing module used with a semantic knowledge base.

A "package model" is a parametric design template for a package.

Figure 1:
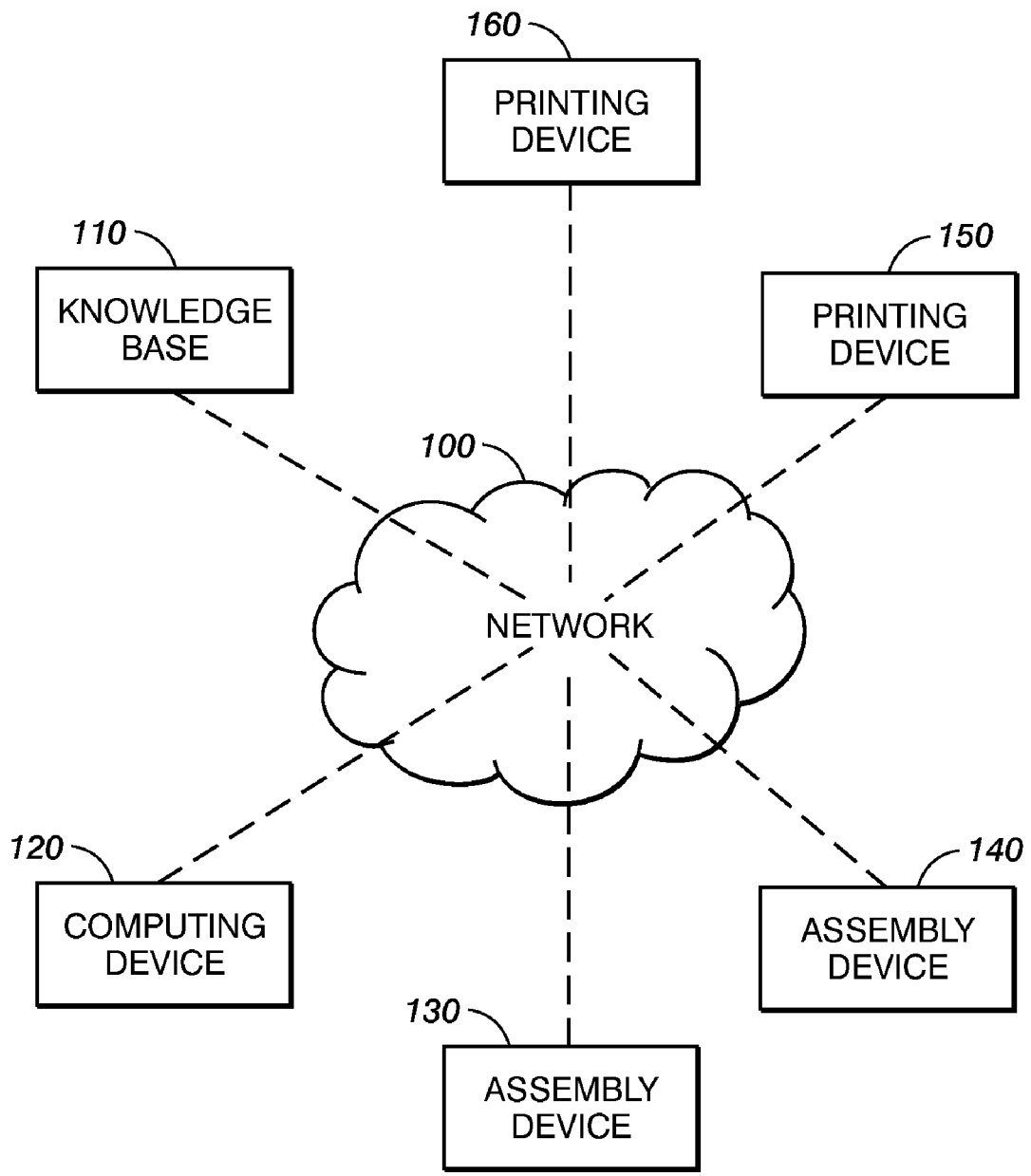
FIG. 1 illustrates a system for assembling a package according to an embodiment.

FIG. 1 illustrates a system for assembling a package according to an embodiment. As shown in FIG. 1, the system includes a knowledge base 110, a computing device 120, one or more assembly devices 130, 140, one or more printing devices 150, 160 and a network 100. A network 100 may include, but is not limited to, a local area network (LAN), wide area network (WAN), Internet, Intranet and/or any other communications network.

The knowledge base 110 may include data in the form of an ontology, such as web ontology language (OWL), which is released by the World Wide Web Consortium, or another format that allows for the description of classes, attributes, individuals and associated relationships between various structural design constructs. The structural design constructs define individuals of a class and provide attribute/value pairs for individuals and restrictions for certain classes. The class concept may be used to represent a group or set of individual objects with similar characteristics. Package design elements for folding cartons, such as panels, flaps and tabs, are examples of potential classes. Attributes may be used to associate individuals or design elements. For example, an attribute such as "hasPanel" might link an individual "Panel" to an individual "Sleeve." In an embodiment, individuals of a class may provide representations of physical and/or virtual aspects of a structural design.

The knowledge base 110 may communicate with a computing device 120, one or more assembly devices 130, 140 and one or more printing devices 150, 160. In an embodiment, the knowledge base 110 may be distributed across a plurality of devices including, but not limited to, the computing device 120, the assembly devices 130, 140, and the one or more printing devices 150, 160. In an embodiment, the knowledge base 110, or a portion thereof, may be contained within one or more of the assembly devices 130, 140, the computing device 120, and/or the one or more printing devices 150, 160. In such an embodiment, the knowledge base 110 may directly communicate with the computing device 120, the one or more assembly devices 130, 140, and/or the one or more printing devices 150, 160 in which it is contained instead of via the network 100.

Figure 2:
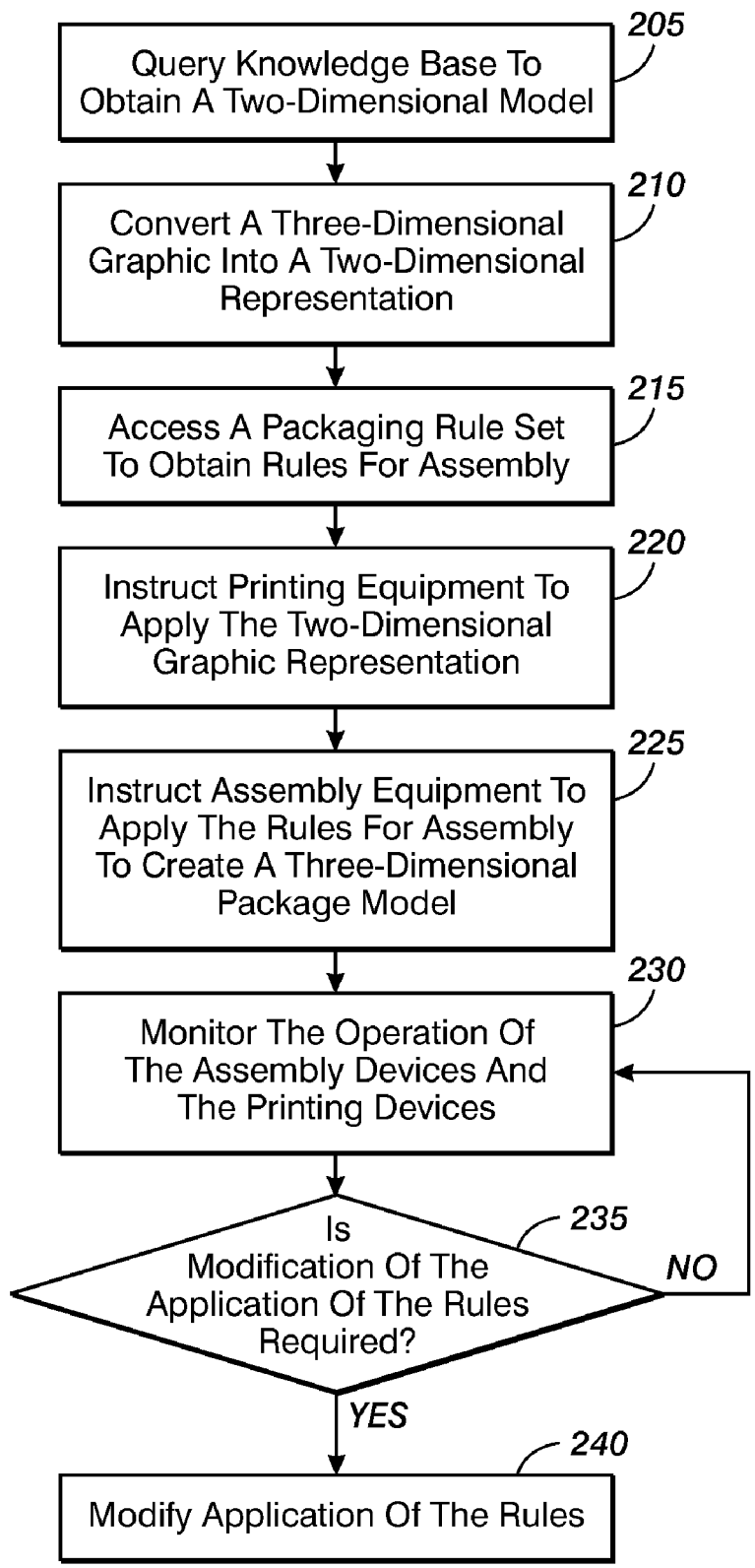
FIG. 2 depicts a flowchart of an exemplary method of assembling a package during preprocessing according to an embodiment

FIG. 2 depicts a flowchart of an exemplary method of assembling a package according to an embodiment. The knowledge base may be queried 205 to obtain a two dimensional model based on a known three dimensional model and a set of intents. A three dimensional model may include a structural design of a package.

The structural design may include one or more geometric shapes and facets used to assemble a package. Each flap, panel, edge and/or tab of the package may be a facet. Flap types may include, but are not limited to, a glue flap, a dust flap, a tuck flap, a male lock flap, a female lock flap and/or a bellow. Panel types may include, but are not limited to, an end panel, a top panel, a side panel, a charlotte, a flanges a cover panel, a front panel and/or a back panel. Edge types may include, but are not limited to, a cut, a crease, a perforation and/or an imaginary edge. The structural design of the package may also include dimensions, performance, weight, a fragility, a shape, an attribute of an individual design component, a relationship between package design components, an intended usage, a lifespan, and one or more environmental conditions, such as whether a package is waterproof, whether a package has UV protection and/or whether a package is recyclable.

A set of intents may include one or more intended functions for a package. A set of intents may include how one anticipates or intends a package to be used. An intent of a package may affect one or more attributes of a package. For example, one may anticipate that a package will be used to transport fragile items. Based on this intended use or function, the query may include a designation that only packages with hard outer surfaces designed to protect a fragile item and/or packages with a soft protective shell, such as bubble wrap, be contained within a query result.

In an embodiment, the set of intents may be determined by user input. For example, a user input may state the following requirements for a rectangular paper carton: 1) the internal dimensions must be 6" high by 4" wide by 2" deep; 2) the bottom of the carton must support 3 pounds when the carton is held upright; 3) the lid of the carton must open and close; and 4) the carton must provide a tuck with locking flaps.

The user input may be analyzed to determine a set of intents. A semantic reasoner may translate the user input into a set of intents associated with the package models.

Figure 3:
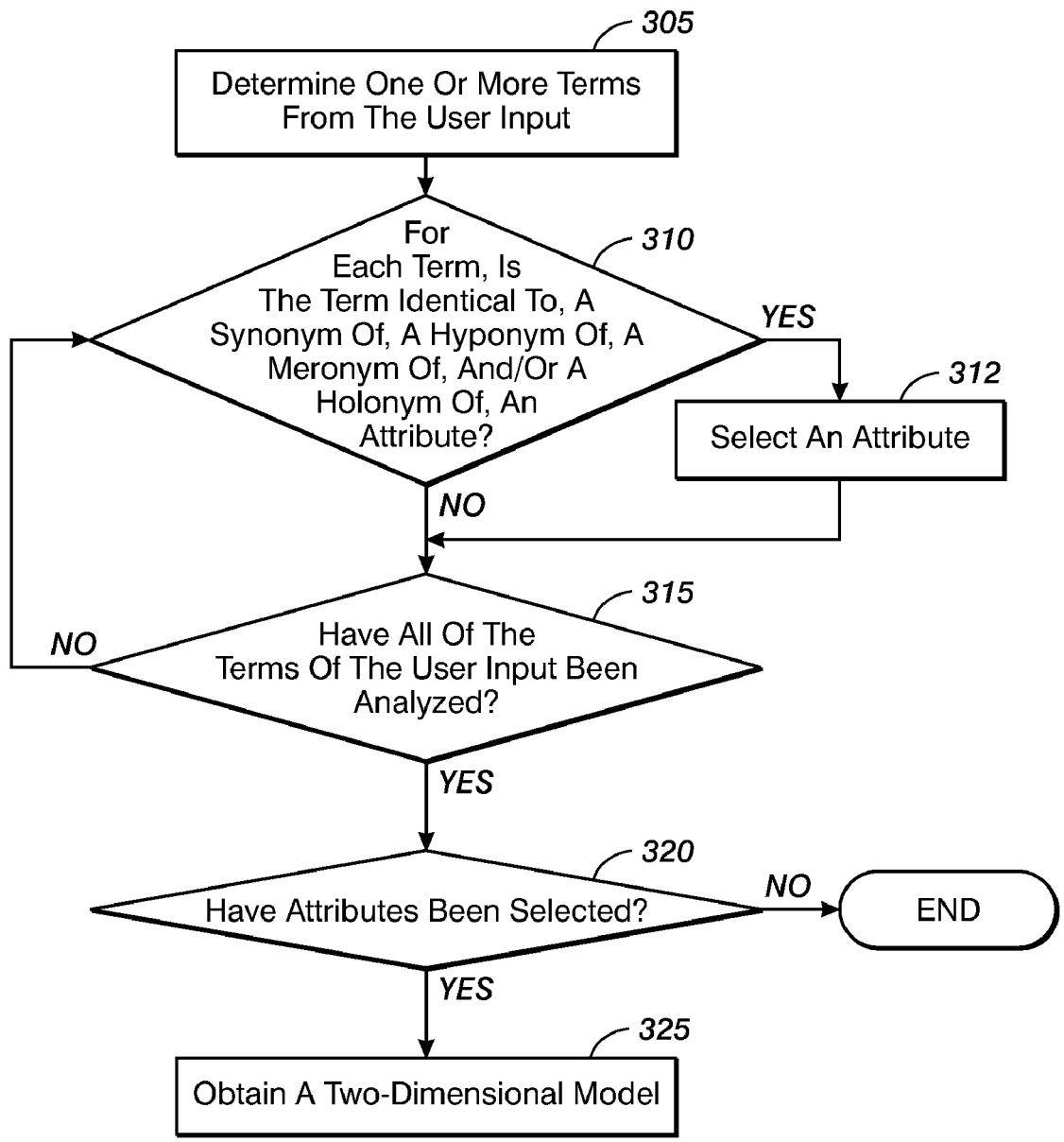
FIG. 3 depicts a flowchart of an exemplary method of analyzing user input according to an embodiment.

FIG. 3 depicts a flowchart of an exemplary method of analyzing user input according to an embodiment. The semantic reasoner may determine 305 one or more terms from the user input. A term may be a word or set of words that is part of the user input.

The semantic reasoner may determine 310 whether a term is identical to, a synonym of a hyponym of, a meronym of and/or a homonym of an attribute in the knowledge base. If so, the attribute may be selected 312. If at least one term has not been analyzed 315, the process may return to 310. Otherwise, the semantic analyzer may determine if one or more attributes were selected 320. If no attributes were selected 320, the semantic analyzer may terminate its analysis because no attributes match the user input. If one or more attributes were selected 320, then a two dimensional model may be obtained 325 based on the selected attributes.

Referring back to FIG. 2, a three dimensional graphic may be converted 210 to a two dimensional representation using a semantic structure. A graphic may include a style and one or more assets. A graphic may include, but is not limited to, a shipping label, a logo, a symbol, a trademark and/or a design on one or more exterior surfaces of the package. In an embodiment, a graphic may be associated with a package model. In an alternate embodiment, a graphic may be independent from a package model. The three dimensional graphic may be converted into a two dimensional graphic using semantic structure.

A packaging rule set may be accessed 215 to obtain rules for assembly of the three dimensional package from the two dimensional package model. In an embodiment, the ontology may be used to obtain an assembly directive to drive the assembly process.

Rules may be used in the assembly of the package. For example, a rule may state that a graphic on the front panel of the package may be no larger than a certain proportion of the size of the front panel. Alternatively, a rule may include graphic placement restrictions so that the graphic does not cover a shipping label.

One or more printing devices may be instructed 220 to apply the two dimensional graphic representation of the three dimensional graphic to the two dimensional package model. The instructions may allow each package to have varied and independent printing from the previous package. The variable and independent packaging process may allow each package to have a different print instruction. A print instruction may result in printing non-uniform items on a package. A print instruction may result in a bar code, a serial number, an address label and/or a packing slip being printed on a package.

One or more assembly devices may be instructed 225 to apply the one or more rules to create a three dimensional package from the two dimensional package model. Assembly devices may include a die cutter which converts sheet materials into shapes for packaging. The instructions may allow the assembling for each package to be varied and independent from the previous package. The variable and independent packaging process may allow each package to have a different assembly. However, all the assembling may be guided by applying the rules for assembly. For example, each package may have different cuts, folds, perforations and creases, but the set of rules for assembly may be the same for each package.

In an embodiment, the operation of the one or more assembly devices and the one or more printing devices may be monitored 230 to determine if modification of the application of the rules is required.

If it is determined that modification of the application of the rules is required 235, then the application of the rules may be modified 240. However, the rule set may remain constant. In other words, the system may only vary the application of the rules and not the rule set.

Figure 4:
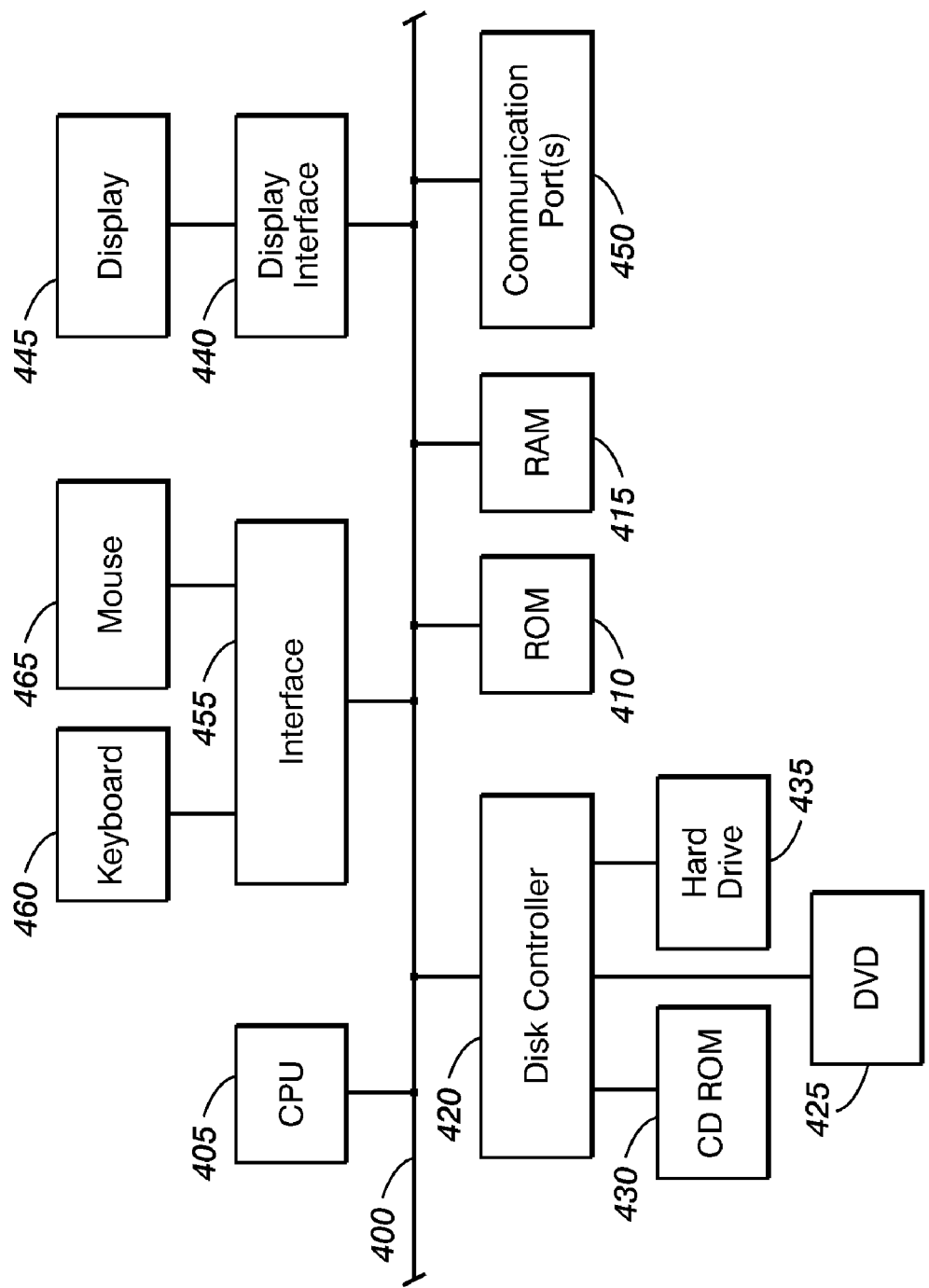
FIG. 4 depicts a block diagram of an exemplary system that may be used to contain or implement program instructions according to an embodiment.

FIG. 4 depicts a block diagram of an exemplary system that may be used to contain or implement program instructions according to an embodiment. Referring to FIG. 4, a bus 400 serves as the main information highway interconnecting the other illustrated components of the hardware. CPU 405 is the central processing unit of the system, performing calculations and logic operations required to execute a program. Read only memory (ROM) 410 and random access memory (RAM) 415 constitute exemplary memory devices or storage media.

A disk controller 420 interfaces with one or more optional disk drives to the system bus 400. These disk drives may include, for example, external or internal DVD drives 425, CD ROM drives 430 or hard drives 435. As indicated previously, these various disk drives and disk controllers are optional devices.

Program instructions may be stored in the ROM 410 and/or the RAM 415. Optionally, program instructions may be stored on a computer readable storage medium, such as a hard drive, a compact disk, a digital disk, a memory or any other tangible recording medium.

An optional display interface 440 may permit information from the bus 400 to be displayed on the display 445 in audio, graphic or alphanumeric format. Communication with external devices may occur using various communication ports 450.

In addition to the standard computer-type components, the hardware may also include an interface 455 which allows for receipt of data from input devices such as a keyboard 460 or other input device 465 such as a mouse, remote control, touch pad or screen, pointer and/or joystick.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A package assembly system, comprising:
    a processor;
    one or more printing devices operatively coupled to the processor;
    one or more assembly devices operatively coupled to the processor;
    a knowledge base; and
    a memory structure containing instructions that instruct the processor to:
        query the knowledge base to obtain a two dimensional package model based on a known three dimensional package model and a set of intents,
        convert a three dimensional graphic representation to a two dimensional graphic representation,
        access a packaging rule set to obtain one or more rules for assembly of a three dimensional package from the two dimensional package model,
        instruct the one or more printing devices to apply the two dimensional graphic representation to the two dimensional package model, and
        instruct the one or more assembly devices to apply the one or more rules for assembly to create the three dimensional package from the two dimensional package model.

2. The system of claim 1 wherein the memory structure further contains instructions that instruct the processor to:
    monitor operation of the one or more assembly devices and the one or more printing devices to determine whether modification of the application of the one or more rules for assembly is required; and
    modify the application of the one or more rules for assembly.

3. The system of claim 1, wherein the knowledge base comprises a structural design ontology.

4. The system of claim 3, wherein the knowledge base is distributed across two or more of the printing devices or assembly devices.

5. The system of claim 1, wherein at least one of the one or more assembly devices comprises a die cutter.

6. A method of assembling a package, comprising:
    querying a knowledge base to obtain a two dimensional package model based on a known three dimensional package model and a set of intents;

converting a three dimensional graphic representation to a two dimensional graphic representation using a semantic reasoner;

accessing a packaging rule set to obtain one or more rules for assembly of a three dimensional package from the two dimensional package model;

instructing one or more printing devices to apply the two dimensional graphic representation of the three dimensional graphic to the two dimensional package model; and instructing one or more assembly devices to apply the one or more rules for assembly to create the three dimensional package from the two dimensional package model.

7. The method of claim 6, further comprising:

monitoring operation of the one or more assembly devices and the one or more printing devices to determine whether modification of the application of the one or more rules is required; and modifying the application of the rules.

8. The method of claim 6 wherein the three dimensional graphic representation comprises one or more of:

a shipping label, a logo, a symbol, a trademark and a design.

9. The method of claim 6, wherein:

the two dimensional package model comprises a plurality of shapes and facets to be assembled into a package;

querying the knowledge base comprises applying the set of intents to the knowledge base.

10. The method of claim 9, further comprising, before the querying:

receiving a user input; and determining a set of intents based on the user input, wherein the set of intents comprises an anticipated use of the three dimensional package.

11. The method of claim 10, wherein determining the set of intents comprises applying the semantic reasoner to the user input to translate the input into the set of intents.

12. The method of claim 9, further comprising:

instructing a die cutter to cut a material into the three dimensional package corresponding to the facets and shapes.

13. A method of variably assembling a package, comprising:

receiving a user input;

determining a set of intents based on the user input, wherein the set of intents comprises an anticipated use of a three dimensional package;

querying a knowledge base to obtain a two dimensional package model based on a known three dimensional package model and the set of intents;

converting a three dimensional graphic representation to a two dimensional graphic representation using a semantic reasoner;

accessing a packaging rule set to obtain one or more rules for assembly of the three dimensional package from the two dimensional package model;

instructing one or more printing devices to apply the two dimensional graphic representation of the three dimensional graphic to the two dimensional package model; and instructing one or more assembly devices to apply the one or more rules for assembly to create the three dimensional package from the two dimensional package model.

14. The method of claim 13, further comprising:

monitoring operation of the one or more assembly devices and the one or more printing devices to determine whether modification of the application of the one or more rules is required; and modifying the application of the rules.

15. The method of claim 13 wherein the three dimensional graphic representation comprises one or more of:

a shipping label, a logo, a symbol, a trademark and a design.

16. The method of claim 13, wherein:

the two dimensional package model comprises a plurality of shapes and facets to be assembled into a package;

querying the knowledge base comprises applying the set of intents to the knowledge base.

17. The method of claim 13, wherein determining the set of intents comprises applying the semantic reasoner to the user input to translate the input into the set of intents.

18. The method of claim 13, further comprising:

instructing a die cutter to cut a material into the three dimensional package corresponding to the facets and shapes.

* * * * *